July 3, 1956   C. G. GOETZEL ET AL   2,753,261
SINTERING PROCESS FOR FORMING A DIE Filed Sept. 30, 1952   5 Sheets-Sheet 1

METHOD "A"            METHOD "B"

INVENTORS
CLAUS G. GOETZEL
JOHN B. ADAMEC
BY Paul Kolisch
ATTORNEY

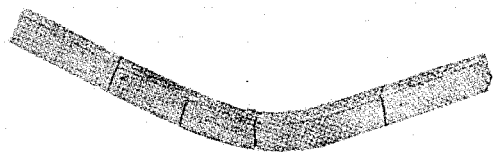
FIG. 8.
FIG. 9.
FIG. 10.
      
FIG. 11.         FIG. 12.         FIG. 13.

July 3, 1956   C. G. GOETZEL ET AL   2,753,261
SINTERING PROCESS FOR FORMING A DIE
Filed Sept. 30, 1952   5 Sheets-Sheet 3

INVENTORS
CLAUS G. GOETZEL
JOHN B. ADAMEC
BY
ATTORNEY

United States Patent Office 2,753,261
Patented July 3, 1956

2,753,261

SINTERING PROCESS FOR FORMING A DIE

Claus G. Goetzel, Yonkers, and John B. Adamec, Floral Park, N. Y., assignors to Sintercast Corporation of America, Yonkers, N. Y., a corporation of New York Application September 30, 1952, Serial No. 312,334

8 Claims. (Cl. 75—204)

The present invention relates to dies for the hot shaping of metals and more particularly to hard carbide die inserts or nibs for the hot extrusion of metals such as brass, bronze, carbon steels, alloy steels, stainless steel, nickel alloys, and the like, including less common metals such as titanium, zirconium, uranium, etc.

While the present invention is of particular interest to the production of extrusion dies, it is also applicable to the production of a wide variety of hot shaping dies including dies for use in die forging, die casting, hot swaging, upsetting, as well as dies of the type employed in powder metallurgy, i. e., hot pressing dies.

It is well known that the process of hot extrusion has achieved within a relatively short period of time a major revolution in the hot working of metals. The extensive progress in this field has been made possible by the development of new and improved extrusion equipment enabling the use of higher extrusion pressures, greater extrusion ratios and even greater extrusion speeds, etc. For example, the recent improvements in this field have made it possible to extrude complicated shapes of such tough metals as stainless steels, certain heat-resistant, high strength nickel-base alloys and certain difficult-to-extrude metals such as titanium. The extrusion of the aforementioned metals have, however, raised many problems in that rather high extrusion temperatures were necessary. One of the principal limiting factors in this regard and certainly one of the most important was die material. Dies work under very arduous conditions in that they are exposed to hot metal and have to withstand the combined effect of thermal and mechanical stresses. In the extrusion of metals at elevated temperatures, for example at temperatures of the order of about 600° C. to 1100° C. and higher, special alloy steel dies are usually employed and have been found to be partially satisfactory depending upon the conditions under which they are used, such as the hot hardness of the metal being extruded, the temperature of extrusion employed, etc. As the extrusion die is subjected to rigorous mechanical and thermal stresses during use, it must posses high hot strength in association with a high degree of toughness to enable the die to adjust itself under the impact of force without cracking. In order to achieve the high toughness of alloy steel dies, it was necessary to compromise on the hardness, as extreme hardness usually led to the cracking of the die, especially dies of complicated shapes. Thus, alloy steel dies (in which toughness was favored over high hardness) were adversely affected at elevated temperatures to such an extent that the die became distorted and exhibited poor die life due to "wash-out" and erosion. This was found to be particularly true when extruding high-strength, high temperature nickel-base alloys which, because of their relatively high plastic strength at elevated temperatures, put excessive burdens on the extrusion die. For example, even in the extrusion of carbon steel at elevated temperatures, the best presently available dies composed of tungsten-bearing steel generally only endured a few extrusions. At the completion of the extrusion operation, the die opening was widened to such an extent that the die was unusable for further extrusion as metals extruded through such a deformed die at elevated temperatures exhibited poor surface quality in that the surface was rough, scaly, and otherwise damaged.

Among the attempts which have been employed in recent years to improve the surface characteristics of extruded or worked metals, especially steel, has been the replacement of alloy steel dies by cemented tungsten carbide dies comprising upwards of about 13% or 20% by weight of cobalt and the balance tungsten carbide. Such dies have the advantage over the steel dies of having greater hot strength, greater hot hardness and improved shape stability at elevated temperatures when subjected to high extrusion stresses. However, the cemented tungsten carbide dies even when shrink-fitted in a supporting alloy steel casing were not wholly satisfactory, especially in hot working operations involving stresses of an impact nature, such as the types of stresses which arise in some hot extrusion operations when a complete billet is extruded in a few seconds. Cemented tungsten carbide dies have certain inherent physical and chemical properties which make them unsuitable for this purpose. For example, these dies are inherently brittle and have low resistance to thermal shock and usually fail by complete cracking and shattering in an annular pattern upon contact with hot metal. This very low thermal shock resistance of the tungsten carbide is due to its low ductility and low thermal conductivity. Also, cemented tungsten carbide dies do not deflect sufficiently enough elastically when subjected to great loads and stresses during extrusion operations. The tendency for a tungsten carbide die to crack and shatter under the influence of the high mechanical stresses will be understood by referring to the modulus of elasticity of cemented tungsten carbide which is in the order of 90,000,000 pounds per square inch (p. s. i.) at room temperature and well above 60,000,000 p. s. i. at temperatures of 600° C to 700° C. Because of the high modulus of elasticity, cemented tungsten carbide dies exhibit brittleness at the aforementioned temperatures or higher and fail prematurely due to their inability to elastically deform which prevents the proper adjustment and seating of the dies in the die casing or holder while under operating stresses. In addition to the foregoing disadvantage, cemented tungsten carbide dies also tend to oxidize spontaneously at the higher temperaturs such as at extrusion temperatures in the order of 1000° to 1100° C. Even at lower temperatures, the cemented tungsten carbide dies oxidize sufficiently to form undesirable surface films on the working portion of the die which affects adversely the surface quality of the extruded material. Because of this inherent characteristic of the die to oxidize easily, the conventional pre-heating of the die prior to extrusion had to be avoided.

In view of the foregoing disadvantages, an attempt was made to solve the problem confronting the art by providing dies from cemented titanium carbide. However, it was found that while titanium carbide dies exhibited much improved resistance to oxidation at elevated temperature as compared to tungsten carbide, these dies likewise were unsatisfactory in that they failed due to heat and stress cracking and to the inability of the cemented titanium carbide die to elastically deform or adjust itself under the sudden impact of extrusion stresses at elevated temperatures. For example, it was found that a titanium carbide die cemented with as much as 20% or even 30% by weight (about 12.3% or 19.2% by volume) of a metallic binder, e. g., cobalt, exhibited a modulus of elasticity of 55,000,000 p. s. i. at room temperature, the modulus of elasticity diminishing only slightly at elevated temperatures, e. g., up to 1000° C. In addition to the foregoing disadvantages, there were other disadvantages. While cemented titanium carbide dies exhibited good hot hardness at high temperatures, this property was usually accompanied by poor hot ductility, hence poor resistance to thermal shock. Further, while the die exhibited good resistance to wear, it exhibited poor cohesive strength at elevated temperatures. In other words, cemented titanium carbide dies were found to lack a desired combination of properties which was considered necessary for good all-around die performance in the shaping of metals at high temperatures.

In evaluating all-around extrusion die performance, it has been found that the following properties in combination (hereinafter referred to as hot shaping properties) are desirable.

(1) Hot hardness combined with hot wear resistance
(2) Hot strength
(3) Resistance to fatigue at elevated temperatures
(4) Hot ductility
(5) Resistance to heat shock
(6) Resistance to oxidation at elevated temperatures
(7) Resistance to high temperature welding, seizing and galling
(8) Expansion coefficient close to that of the supporting steel
(9) Modulus of elasticity close to that of the supporting steel
(10) Low coefficient of friction In addition to the foregoing properties, the hot extrusion die should also have adequate heat conductivity. If the heat conductivity is too low, the die is subject to localized surface overheating at the area of contact with the hot metal which leads to high thermal stresses resulting in surface heat checking or cracking of the die, loss of surface hardness, and/or even "wash-outs" and erosion. On the other hand, if the heat conductivity of the die is too high, the supporting alloy steel casing is subject to overheating which may lead to a loosening of the shrink-fit and hence to the cracking of the die under the high extrusion stresses.

From the foregoing, the complex nature of the die problem which has confounded the art for many years becomes apparent. Although many attempts were made to overcome the aforementioned difficulties and other disadvantages, none, as far as we are aware, was entirely successful when carried into practice commercially on an industrial scale.

We have discovered that dies or die nibs suitable for the hot shaping or hot working of metals and alloys can be produced to possess the aforementioned hot shaping properties and to give improved die life and performance provided that they contain substantial amounts of titanium carbide (40% to 80% by volume) and a heat-resistant matrix-forming metal or alloy. Such dies will have a modulus of elasticity less than 45,000,000 p. s. i. over a wide temperature range down to room temperature and a coefficient of expansion close to that of the steel block supporting it. In addition, such dies will have a high rupture strength at elevated temperatures, high hot hardness and highly improved ductility at temperatures in excess of 750° C. Also, such dies are characterized by being markedly resistant to oxidation, to die wear, and to fluctuating thermal stresses and heat shocks at elevated temperatures.

Other advantages of the invention will become apparent from the following description taken in conjunction with the accompanying drawing in which:

Fig. 8 is a reproduction of a photograph of a bend-test specimen made of an infiltrated titanium-base carbide body produced in accordance with the invention showing its good hot-bending property.

Fig. 9 is a reproduction of a photograph of a bend-test specimen of an infiltrated titanium-base carbide outside the invention showing its inferior hot-bending property.

Fig. 10 is a reproduction of a photograph of a bend-test specimen of a cemented titanium carbide body showing its poor hot-bending property.

Figs. 11, 12, and 13 are reproductions of photographs showing an infiltrated titanium-base carbide body produced in accordance with the invention, a cemented titanium carbide body, and a cemented tungsten carbide body, respectively, after being subjected to high temperature oxidation.

Figure 14:
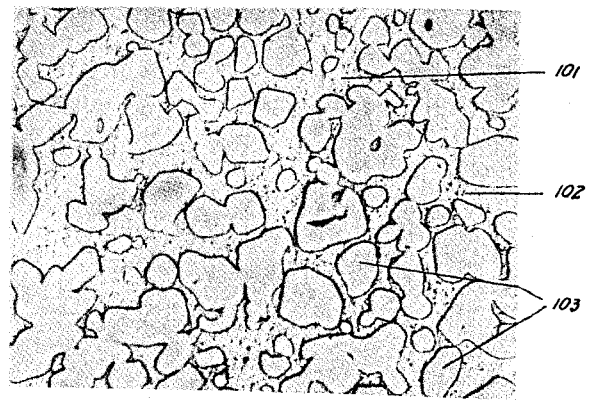
Figure 15:
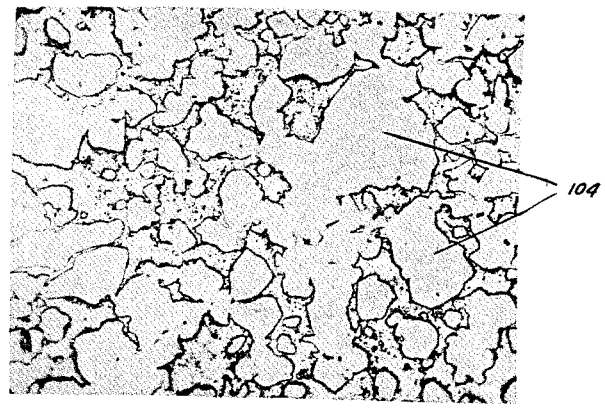

Figs. 14 and 15 are reproductions of photomicrographs of infiltrated titanium carbide dies depicting the structure resulting from proper and improper application of the matrix-stabilizing treatment, respectively.

Figure 16:
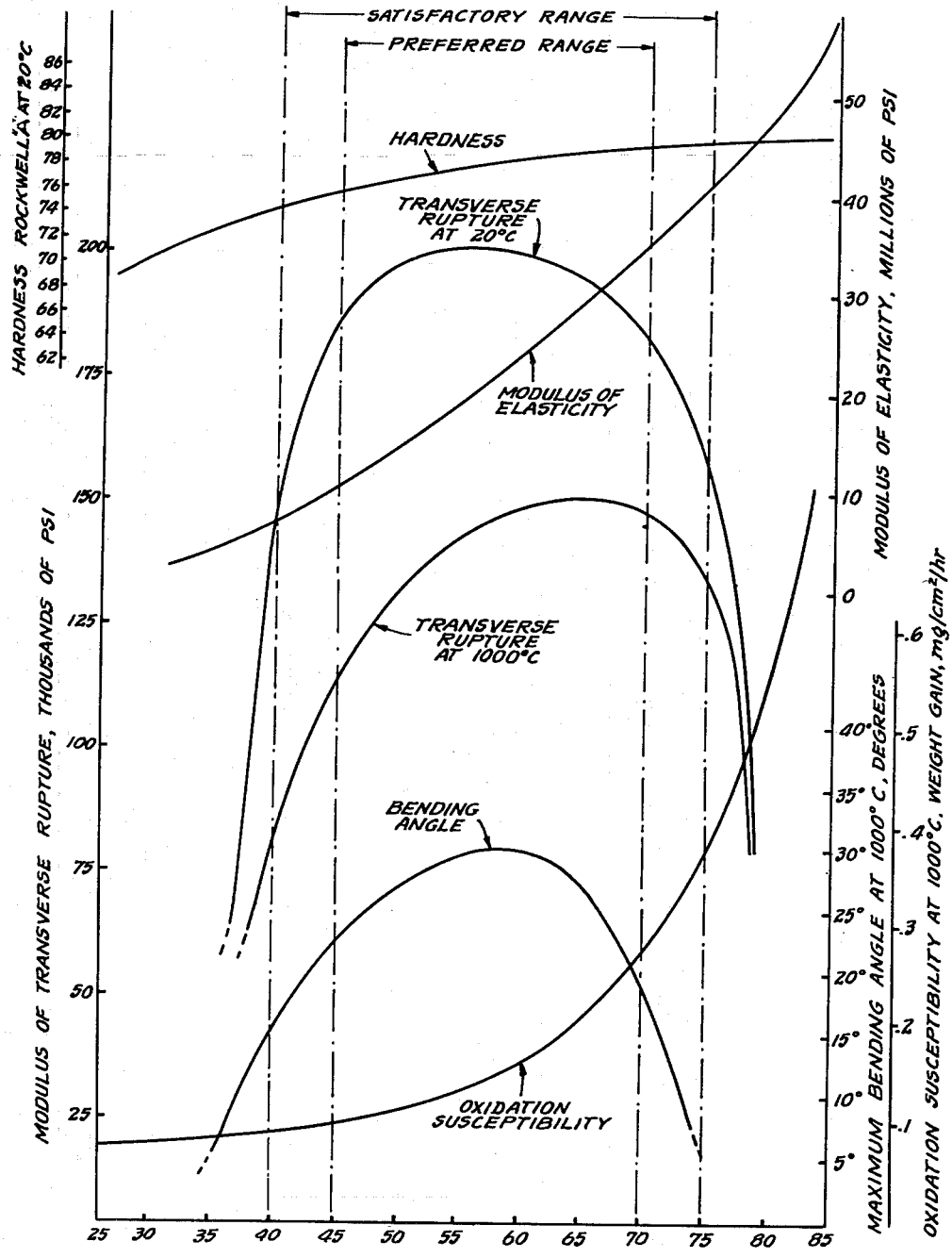
Figure 17:
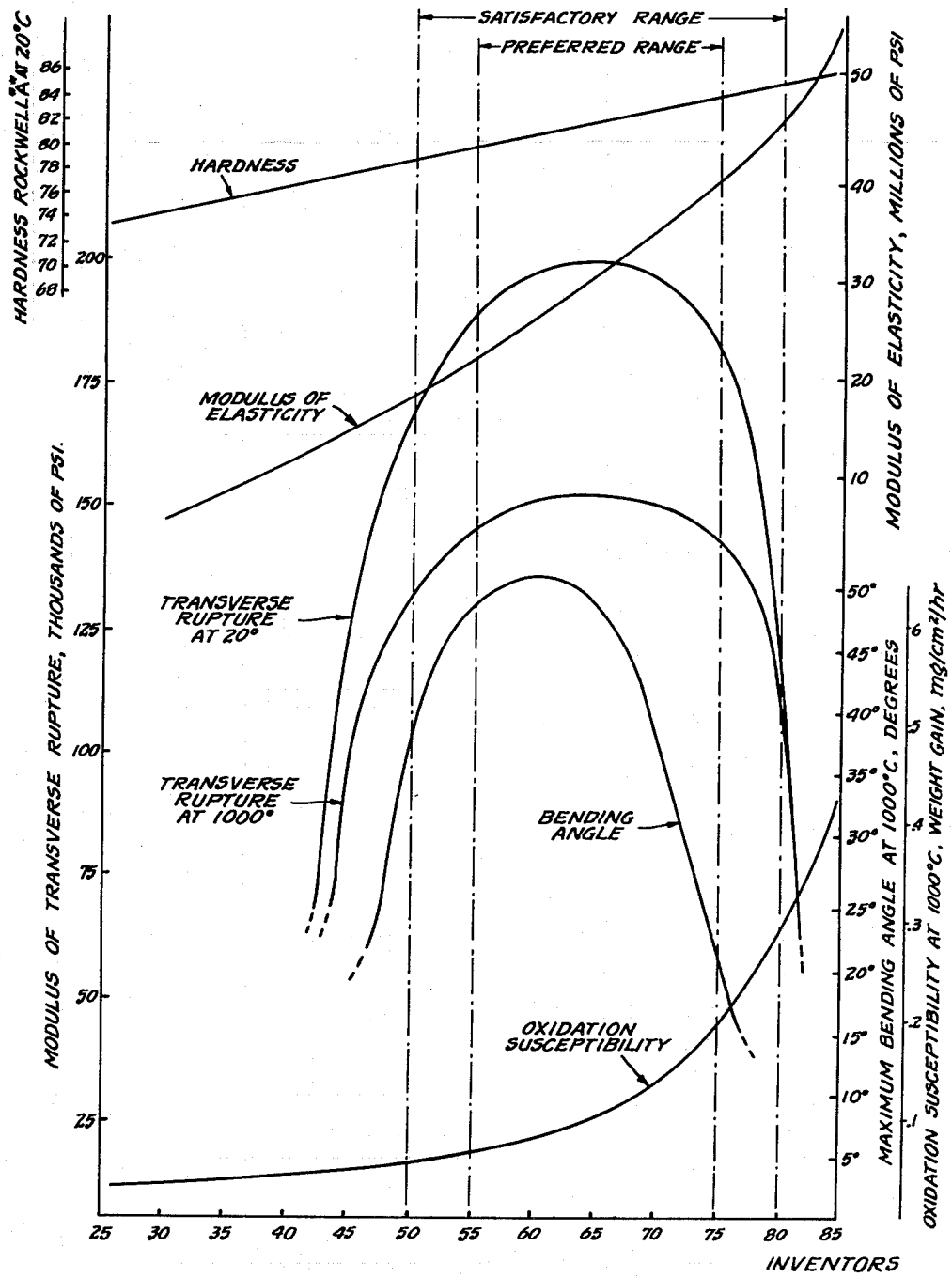

Figs. 16 and 17 depict curves showing the physical and mechanical properties of titanium carbide bodies correlated with the composition of bodies (percent by volume titanium carbide) infiltrated with a heat-resistant, nickel-base alloy and with a heat-resistant, cobalt-base alloy, respectively.

The present invention is based on the discovery that hot shaping dies comprising a composite material containing titanium carbide can be produced having an improved combination of hot shaping properties such as wear resistance, oxidation resistance, heat and stress resistance, high hot hardness, toughness, etc. In producing dies in accordance with the invention, a material is employed containing about 40% to 80% by volume of titanium carbide, substantially the balance being a heat and oxidation resistant, high temperature alloy which may comprise metals taken from the group consisting of iron, cobalt, and nickel, their alloys with each other and with chromium, molybdenum, tungsten, and vanadium, as well as columbium and tantalum. It will be understood that the expression "substantially the balance being a heat and oxidation resistant, high temperature alloy" does not exclude the presence of residual elements such as carbon, nitrogen, silicon, manganese, copper, etc., which may be present as impurities or which may be intentionally added without deleteriously affecting the heat resistant alloy. Test results have shown that hot extrusion dies provided by the invention can be used for a great number of extrusion pushes or working cycles on such different metals as low carbon steel, uranium or low brass without noticeably deforming, wearing, cracking, or even shattering, or otherwise becoming defective. The dies produced by the invention exhibit remarkable shape retention properties when subjected to high temperature extrusion stresses and are capable of reproducing, during extended operations, extruded products having substantially uniform dimensions throughout their length and cross section. In addition the low coefficient of friction in combination with the high hot hardness and wear resistance of the titanium carbide-containing composite results in a substantial reduction in extrusion pressure exerted on the billet, and in excellent surface finishes of the extruded products.

In producing the die, it is essential that the titanium carbide be sintered in the presence of a matrix-forming metal composed of a heat and oxidation resistant alloy in a liquid state at a temperature at least above the liquidus temperature of said matrix-forming metal but substantially below the melting point of the titanium carbide, in a technical vacuum or a controlled atmosphere of sub-atmospheric pressure of less than 2500 microns of mercury column, and for a time sufficient to allow the liquid matrix-forming metal of the heat and oxidation resistant alloy to completely wet the titanium carbide and to form a continuous matrix surrounding individual and aggregated titanium carbide particles. The time and temperature should be such that the composite body maintains its shape during the liquid phase sintering cycle. The sintering may be carried out in the presence of a stationary or a moving liquid phase comprised essentially of the heat and oxidation resistant matrix-forming metal. Although the liquid phase of the matrix-forming metal at the beginning of the sintering cycle may consist essentially of the heat and oxidation resistant alloy originally introduced, it will be appreciated that as sintering progresses, the matrix-forming metal will undergo a modification in composition and in certain physical and mechanical properties by phase reactions involving essentially the heat and oxidation resistant alloy and the titanium carbide. Upon completion of the sintering cycle, the thus-formed composite body is cooled in vacuum to substantially below the solidus or freezing temperature of said matrix-forming metal whereby a hard metal carbide die body is produced having a microstructure comprising a continuous matrix containing the heat and oxidation resistant metal alloy with fine particles of a precipitate evenly dispersed therethrough and larger isolated titanium carbide particles and particle aggregates having a substantially or partially spheroidized polygonal shape. When the die body is produced having the aforementioned microstructure, an outstanding combination of hot shaping properties obtains.

In carrying out the invention, many types of proven heat and oxidation resistant alloys can be employed as the matrix-forming metal. For example, the alloy known by the trademark Nichrome, which contains approximately 60% nickel, 24% iron, and 16% chromium, has also been found suitable. Another alloy known by the trademark of Inconel, which contains approximately 80% nickel, 14% chromium, and 6% iron, has been found excellent in producing dies. The alloy known by the trademark Hastelloy C, which contains about 58% nickel, 17% molybdenum, 15% chromium, 5% tungsten, and 5% iron, has been found to give good results. Still another is the alloy which is sold under the trademark of Vitallium. This alloy contains approximately 69% cobalt, 25% chromium, and 6% molybdenum. The alloy sold under the trademark Stellite 31 has been found adequate. It contains about 56% cobalt, 26% chromium, 10% nickel, 7.5% tungsten, and 0.5% carbon. In addition to the foregoing heat resistant alloys, other types of heat resistant alloys containing substantial amounts of iron may be employed, such as the 18–4–1 high speed steel (containing about 77% iron, 18% tungsten, 4% chromium, and 1% vanadium), such as the molybdenum-containing, high-nickel and high-chromium stainless steel (e. g., an alloy containing about 53% iron, 25% nickel, 16% chromium, and 6% molybdenum), such as the austenitic 18–8 stainless steel containing approximately 74% iron, 18% chromium, and 8% nickel, and such as the ferritic high chromium stainless steels containing 14%, 18%, or 27% chromium, the balance substantially iron. It will be appreciated that the foregoing heat and oxidation resistant alloys are merely illustrative of the types of matrix-forming metal alloys that can be employed and that modifications of these alloys are contemplated within the scope of the invention. In other words, the matrix-forming infiltrant metal may be comprised of heat and oxidation resistant nickel-base, cobalt-base, and iron-base alloys. For example, alloys of the aforementioned types containing effective amounts of the so-called well-known strengthening elements, such as zirconium, titanium, aluminum, etc., are also contemplated within the scope of the invention.

In carrying the invention into practice, it is preferred to produce hot shaping dies by the powder metallurgy method of infiltration. In this method, the sintering is accomplished by employing a moving liquid phase of the heat-resistant metal alloy. By employing the preferred embodiment, the product can be closely controlled and optimum results can be consistently obtained. In producing dies by the preferred method, a porous carbide skeleton body containing titanium carbide is prepared, is shaped roughly into a die, and is then infiltrated or impregnated in a vacuum at an elevated temperature with a molten heat and oxidation resistant alloy.

The composition of the infiltrated die body comprises about 40% to 80% by volume of titanium carbide and about 60% to 20% by volume of the heat and oxidation resistant alloy. For consistent results, it is preferred that about 45% to 75% by volume of titanium carbide be employed, substantially the balance comprising about 55% to 25% of the heat and oxidation resistant alloy. A satisfactory composition, and one that gives good commercial results, comprises about 50% to 80% by volume of titanium carbide and about 50% to 20% by volume of a heat resistant cobalt-base alloy. Another satisfactory composition comprises about 40% to 75% by volume of titanium carbide and about 60% to 25% by volume of a heat resistant nickel-base alloy. Still another satisfactory composition comprises about 40% to 70% by volume of titanium carbide and about 60% to 30% of a heat resistant iron-base alloy. Of course, small amounts of other metal carbides, preferably in solid solution with titanium carbide, may be employed with the titanium carbide without departing from the scope of the invention. For example, a die body may be comprised of a titanium-base carbide containing up to 5% each of such metal carbides as silicon carbide, boron carbide, and up to 10% each of chromium carbide, vanadium carbide, molybdenum carbide, tungsten carbide, zirconium carbide, or hafnium carbide, the total amounts of these carbides not exceeding 25% by volume of the die body. The titanium-base carbide may be employed over the same ranges set forth hereinabove for the titanium carbide in carrying out the invention. By titanium-base carbide is meant a carbide comprising substantially titanium and includes titanium carbide per se.

In making the die by the preferred method, a porous skeleton carbide body containing substantially titanium carbide is prepared by first admixing with the powdered carbide a metallic auxiliary binder component, such as nickel, cobalt or iron in minor proportions up to about 10% by weight of the titanium carbide. A titanium carbide powder which has been found suitable in carrying out the invention is one containing approximately 18% combined carbon and about 2.5% of graphitic carbon. Such powder is preferably heated to a high temperature under controlled atmosphere conditions in order to combine part of the free carbon with the residual oxygen, nitrogen, or the metallic titanium present in the titanium carbide powder. After pulverizing the thus-treated titanium carbide powder to pass through a 140 mesh screen, it was found to give exceptionally good and reproducible results when employed in producing dies in accordance with the invention.

The skeleton body, having intercommunicating pores therethrough, is produced either by hot pressing or by cold pressing a mixture of the titanium carbide and the metallic cementing component. If the powder mixture is cold-pressed into a porous body, it is given a pre-sintering treatment in a reducing atmosphere preferably at a temperature ranging from about 1100° C. to 1300° C. for a time sufficient to produce a coherent skeleton body capable of withstanding handling in subsequent operations, i. e., for a time equivalent to at least about 10 minutes per cubic inch of the body.

In the event the powder mixture is hot pressed, a pre-sintering treatment is not required provided the hot pressing temperature is above the liquefaction temperature of the cementing component. After hot pressing the die body, or cold pressing followed by pre-sintering, the resulting skeleton body is machined to a size close to the final die specifications by cutting with cemented carbide tools, or by refractory wheel grinding, diamond chipping, or other methods commonly employed in the fabrication of hard carbide products. In machining the die body, an over-size shrinkage allowance of about 5% to 10% is made in order to compensate for the shrinkage which occurs in subsequent heating operations. It is, however, of particular advantage to machine the skeleton die bodies in such a way that the center bore hole (i. e., the center bore hole corresponding to the die throat or barrel) is not drilled or cut all the way through the die body, but rather is left in the form of a blind hole. Such a blind hole functions as a reservoir for the molten infiltrant metal alloy in subsequent infiltration operations. Thus, the infiltrant metal is placed in the reservoir, the body infiltrated at a temperature above the liquidus temperature of the infiltrant metal in vacuum and after cooling the reservoir remaining removed during the finish machining operation. As illustrative of the foregoing, attention is directed to Figures 1 to 7, inclusive, which show two methods which may be employed in preparing die bodies within the scope of the invention. In method A (Figs. 1-4) a powder containing substantially titanium carbide is cold-pressed into a blank illustrated in Fig. 1. The blank is then subjected to a pre-sintering operation in a reducing or inert atmosphere or vacuum ranging from an initial pressure of about 1000 microns to a final or finishing pressure of about 50 microns or lower of mercury followed by cooling. The thus pre-sintered blank is rough machined to form two blind holes 1 and 2 seperated by a thin permeable barrier or membrane 3 illustrated in Fig. 2.

The rough machined die body is then subjected to a high temperature sintering treatment in order to effect additional bonding of the carbide particles into a porous skeleton of sufficient strength to enable the body to retain its shape during subsequent infiltration treatment. The resulting skeleton is then composed of a network of a titanium-base carbide having intercommunicating pores therethrough. In carrying out the high temperature sintering operation, it is preferred to sinter the skeleton body at a temperature between 50° C. and 250° C. above the temperature used in the subsequent infiltration operation. Moreover, it is also preferred that the high temperature sintering be carried out in a technical vacuum corresponding to a sub-atmospheric pressure ranging from an initial pressure of preferably not more than 1000 microns down to a final or finishing pressure of 50 microns of mercury and preferably 10 microns. The surrounding gas at such subatmospheric pressure must be reducing or inert to prevent decarburization and oxidation of the titanium-base carbide during the treatment. If a carbon tube furnace is used, the carbon monoxide atmosphere resulting from the reaction between the tube and residual oxygen present in the technical vacuum is most advantageous for this work. Other gases found useful for carrying out the sintering of the titanium-base carbide skeleton are desiccated helium and argon. The time for sintering varies with the size and cross section of the die body and is dependent on the rate of evacuation at the sintering temperature down to a vacuum ranging from about 250 to 50 microns of mercury. The time of sintering at the aforementioned temperature range will depend upon the size of the skeleton body which determines the quantity of gases to be evacuated during the treatment. For example, a sufficient sintering time, while maintaining a vacuum ranging from about 250 microns down to 50 microns, was found to be from 20 to 60 minutes per cubic inch of skeleton body. The highly sintered titanium-base carbide skeleton body is then cooled in the vacuum prevailing.

Figure 3:
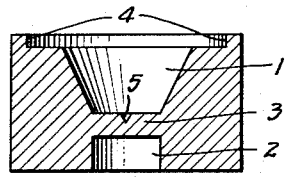
Figure 7:
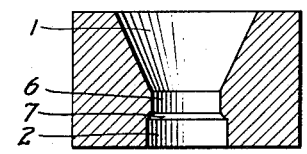
Figure 4:
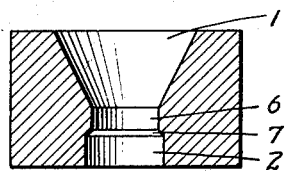

The skeleton is then further machined in a preparation for infiltration to the shape shown in Fig. 3. It is preferred that the more complicated contours of the die be machined after the high temperature sintering treatment as the pre-sintered skeleton bodies are usually too delicate for such handling. Thus, after giving the skeleton a high temperature sinter, a retaining wall, ridge, or lip 4 is machined in the die for the purpose of serving as a retainer for the liquid infiltrant metal and also to expose a maximum surface to the infiltrant metal. In addition, the blind hole or reservoir 1 is enlarged to follow the die contour and a small depression 5 is machined into the thin barrier 3 separating blind holes 1 and 2. The purpose of machining depression 5 shown in Fig. 3 is to facilitate the final machining operation after completion of the infiltration treating cycle. A break-through usually occurs through 5 near the end of the infiltration process with the advantageous result that very little of the barrier 3 remains to be machined away after infiltration is completed. However, in machining depression 5, the barrier must be kept to a sufficient thickness so that it will remain intact and hold the infiltrant metal long enough to insure complete infiltration throughout the die body.

In carrying out the infiltration step, an amount of infiltrant metal sufficient to completely fill the open spaces in the skeleton is placed in the blind hole or reservoir 1. Alternatively, part of the infiltrant metal may be placed in blind hole 1 and part of it in blind hole 2 and infiltration accomplished in this manner. Thus, the blind holes or reservoirs serve as a means of efficiently distributing the infiltrant metal by mass capillary action throughout the whole of the porous skeleton die body. In other words, the die body serves as its own reservoir for the infiltrant metal which thus helps to minimize contamination generally experienced in other infiltration methods.

The infiltrant metal employed in carrying out the process is preferably prepared for infiltration by vacuum fusion and vaccum casting into a shape approximating the die contour. Thus, the prepared casting of infiltrant metal is made to fit snugly the machined-out blind hole or reservoir. Of course, the infiltrant metal may be added to the reservoir of the die body in other forms, such as machine cuttings, shot, powder compacts, etc. The skeleton die containing the infiltrant metal is placed in a suitable ceramic container, crucible or vessel. If necessary, the annulus formed between the outside diameter of the die and the inside diameter of the ceramic container may be filled with an inert mass of powdered granular material so as to prevent the overflow of molten infiltrant alloy and its flow downward along the outside surface of the skeleton body before the capillary forces can effectively draw the molten alloy into the interior of the die body. One material which has been found especially effective is powdered granular aluminum oxide of high chemical purity as described in co-pending application U. S. Serial No. 292,498 filed June 9, 1952 in the names of the applicants. Upon completion of the infiltration treatment and after the die body has been cooled, the die body is finish machined to the final shape shown in Fig. 4 wherein blind holes 1 and 2 are merged to form the inlet and outlet ports of the die, respectively, and wherein 6 is the die throat or barrel and 7 a bevel adjacent said die throat or barrel.

The infiltration may be carried out in a carbon tube furnace or other types of special high temperature furnaces employing high frequency induction or direct resistance as the heat source. The assembly of the skeleton die body and the properly positioned infiltrant alloy are heated to a sintering temperature from about 25° C. to 250° C. above the liquidus temperature of the infiltrant alloy. A controlled atmosphere of sub-atmospheric pressure is preferred, i. e. a technical vacuum ranging from a maximum pressure of not more than 2500 microns at the instant of melting of the infiltrant down to a final or finishing pressure of 50 and preferably 10 microns of mercury. The atmosphere may be reducing and may contain carbon monoxide as the result of a reaction between the carbon tube of the furnace and the small amounts of residual oxygen usually present in a technical vacuum, or the atmosphere may be inert or neutral, such as desiccated helium or argon. When employing these inert or neutral gases or such reducing gases as hydrogen under sub-atmospheric pressure, a steady flow of these gases is advantageous in that any metal vapors formed in the high heat zone of the furnace during the melting of the infiltrant metal and its penetration into the skeleton body can be swept out, thus permitting clean furnace operation and reproducible infiltration results. The time at infiltration temperature is dependent on the cross section of the die body, the characteristics of the infiltrant alloy in the liquid state, and also on the rate of evacuation of gaseous impurities at the infiltration temperature. As will be shown hereinafter, the time must be sufficient to complete the penetration of the liquid infiltrant alloy throughout the entire pore system of the skeleton body and also to allow for the completion of diffusion and other chemical and metallurgical reactions that take place between the titanium-base carbide skeleton and the liquid infiltrant and which results in a stable matrix structure. For example, a total time of ½ hour to 2½ hours at the infiltration temperature has been found adequate for each cubic inch of skeleton body for both the infiltration and the matrix stabilizing treatments.

Figure 5:
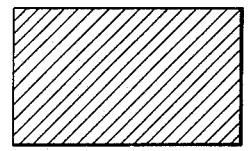
Figure 6:
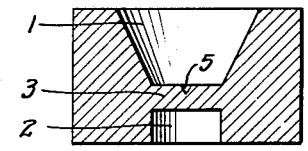

As has been mentioned hereinbefore, method B (represented by Figs. 5 to 7) may be alternatively employed in producing die bodies. Thus, a pressed blank containing titanium carbide is produced as shown in Fig. 5, presintered as described hereinbefore and rough machined to a die contour to form blind holes 1 and 2 separated by a thin permeable barrier or membrane 3 having a small depression or hole 5 therein as shown in Fig. 6, then given a high temperature sinter as described in method A followed by infiltration with a heat and oxidation resistant alloy, and the thus-infiltrated die body finally finish machined to produce the die illustrated by Fig. 7 wherein blind holes 1 and 2 are merged to form the inlet and outlet ports of the die and wherein 6 is the die throat or barrel and 7 a bevel adjacent said die throat or barrel.

It should be appreciated that the foregoing methods of preparing a die from a skeleton body are merely illustrative and that other steps of machining or forming an infiltrant reservoir in the skeleton body can be employed without substantially departing from the basic concepts of the invention, as will be shown hereinafter in the examples.

It has been found that the infiltration procedure is critical in obtaining the results of the invention. For example, it is not sufficient just to completely infiltrate the body to its maximum possible density. On the contrary, after the infiltration operation has been substantially completed, the infiltrated body must then be given a matrix-stabilizing treatment. This treatment which is very important for obtaining the results of the invention comprises subjecting the thus-infiltrated body in situ to additional heating at substantially the infiltration temperature for a time sufficient to complete the diffusion, solution, and alloying reactions which occur between the matrix-forming infiltrant metal and the titanium carbide, whereby the matrix resulting from the treatment is metallurgically stabilized. It is only by employing the matrix-stabilizing treatment that it is possible to obtain the fullest cooperating effect between the titanium carbide and the matrix-forming infiltrant metal so as to achieve the new and vastly improved results provided by the invention.

If no time is allowed for the matrix-stabilizing treatment subsequent to infiltration or if such time is insufficient, the original skeleton structure of the titanium-base carbide maintains and the die having such a structure will not have the desired combination of physical and mechanical properties, and in particular will have poor hot strength, poor hot ductility, and poor resistance to thermal shock. On the other hand, when the matrix-stabilizing time following the complete penetration of the pore system by the molten infiltrant is adequate, the original skeleton network of angular-like polygonal titanium-base carbide particles is physically modified so that the carbide particles forming the original continuous network become partially or substantially spheroidized and become isolated either singly or in clusters or aggregates. The micro-structure resulting from the foregoing matrix-stabilizing treatment comprises a dominant, continuous phase containing the matrix-forming infiltrant metal having dispersed evenly therethrough fine particles of a precipitate and isolated titanium-containing carbide particles and particle aggregates, the particles having substantially spheroidized and/or partially spheroidized polygonal shapes.

The exact mechanism by which the modification of the carbide skeleton structure is effected is not clearly understood. However, it is believed that as the infiltration process progresses, the infiltrant metal, in addition to filling up the pores in the skeleton, also penetrates the skeleton body along the carbide interfaces, thereby dissolving and/or dislodging the original cohesive bonds at the contact areas between adjacent carbide particles. As a result, the original skeleton structure becomes partially disrupted and discontinuous, resulting in isolated particles or particle aggregates, while the matrix-forming infiltrant phase becomes a dominant and continuous matrix structure. Since the overall volume changes of the composite body are only of a small order of magnitude, it is apparent that at least part of the skeleton material at the carbide interfaces is dissolved into the infiltrant alloy matrix rather than being merely physically displaced. This appears to be borne out further by the observation under the microscope of an evenly dispersed minute hard precipitate in the solidified infiltrant alloy matrix. It is believed that this precipitate is produced as a result of the solution by the infiltrant metal of part of the skeleton material at the interface of the original carbide particles which after cooling is precipitated throughout the matrix as very fine particles. This also seems to be borne out by microhardness tests which have disclosed unusually high hardness numbers for the matrix material which are far above the hardness of the original infiltrant alloy. To illustrate this point, a typical microhardness number of a precipitate-containing matrix of an Inconel-infiltrated titanium carbide die was found to be equivalent to about 600 kilograms per square millimeter (kg./mm.$^2$) Vickers as compared to a hardness number equivalent to about 120 to 240 kg./mm.$^2$ Vickers of the original Inconel alloy prior to infiltration.

Whatever the explanation, it is important that the correct microstructure be obtained if the results of the invention are to be achieved. During the matrix-stabilizing treatment subsequent to the complete absorption of the infiltrant metal in the pore system of the skeleton, the liquidus phase gradually becomes a continuous matrix while the die body retains substantially its shape despite the substitution of a liquid matrix for the solid carbide network as a dominant and possibly the predominant phase. It is also important that the temperature subsequent to infiltration be critically controlled. In general it is preferred that the time allowed for the matrix-stabilizing treatment is greater than the time (e. g., at least twice the time) found necessary to achieve complete penetration of the pore system of the skeleton by the matrix-forming liquid infiltrant under substantially the same temperature conditions. The nearer this temperature is to the liquidus temperature of the infiltrant metal, the longer is the time required for stabilizing the matrix and vice versa. When the matrix-stabilizing treatment is finished, the die body is cooled in vacuum to below the freezing point of the liquid matrix, preferably at a slow rate of at most about 25° to 50° C. per minute. As a result of the foregoing treatment, the die body has the micro-structure mentioned hereinbefore comprising a matrix containing the infiltrant metal having dispersed therethrough fine particles of a precipitate, and the larger, substantially or partially spheroidized polygonal-like particles of the titanium-base carbide from the original skeleton. If the die body is not given the proper matrix-stabilizing treatment, subsequent to completion of infiltration, the original titanium carbide skeleton structure comprising angular particles maintains and the die will not have the desired combination of physical and mechanical properties.

As illustrative of the foregoing, attention is directed to Figs. 8 and 9. Fig. 8 illustrates a titanium-base carbide test bar produced in accordance with the invention and given the proper matrix-stabilizing treatment showing its ability to markedly deform under stress at an elevated temperature. Fig. 9 depicts a similar titanium carbide body which was not given the proper stabilizing treatment subsequent to completion of infiltration and shows its inferior hot deforming property. For comparative purposes, a cemented titanium carbide body containing 20% by weight of nickel was similarly tested (see Fig. 10) and was found to have extremely poor deforming properties. All of the foregoing specimens illustrated in Figs. 8, 9, and 10 had been subjected to a bend test at a temperature of 1000° C. by centrally loading up to the breaking load a 3-inch test bar supported by two knife edges over a span of 2¾ inches.

The test specimens illustrated in Figs. 8 and 9 were prepared by completely infiltrating a carbide skeleton comprising about 63% by volume of titanium carbide with a nickel-base alloy known by the trade name of Inconel. Subsequent to completion of infiltration, the specimen depicted in Fig. 8 was then subjected to a matrix-stabilizing treatment in situ at substantially the infiltration temperature for 50 minutes. The specimen depicted in Fig. 9 was not given the matrix-stabilizing treatment. Thus, while both specimens had virtually the same composition and virtually the same density of 6.2 grams per cubic centimeter, the test specimen which was matrix-stabilized in accordance with the invention (Fig. 8) exhibited a hot-bending angle of over 30° under a bending stress of 125,000 p. s. i. without fracturing, while the specimen which was not matrix-stabilized in accordance with the invention exhibited a hot-bending angle of only 15° for virtually the same composition under a low breaking stress of 85,000 p. s. i. The titanium carbide cemented with 20% by weight of nickel (Fig. 10) which exhibited practically no bending angle at 1000° C. had a low breaking stress of 63,000 p. s. i. and was markedly inferior to the test specimen produced in accordance with the invention (Fig. 8).

The necessity for subjecting the titanium carbide body to the proper matrix-stabilizing treatment subsequent to infiltration is also illustrated by referring to Figs. 14 and 15 which show the microstructure of a properly and improperly treated titanium carbide body, respectively. Fig. 14 shows the microstructure at 1000 times magnification of an infiltrated body within the invention which comprises a matrix containing the infiltrant metal 101 having dispersed therethrough fine particles of a precipitate 102 and essentially isolated larger titanium carbide particles and particle aggregates having substantially spheroidized polygonal shapes, 103. Fig. 15, on the other hand, shows a microstructure at 1000 times magnification in which the titanium carbide particles 104 have relatively sharp corners and edges typical of polygonal shape and are substantially in the close-packed position of the original skeleton. When the microstructure illustrated by Fig. 14 is obtained as a result of the matrix-stabilizing treatment, the titanium carbide die provided by the invention has good hot ductility and can withstand and adjust itself to the sudden application of extrusion stresses. When the microstructure represented by Fig. 15 is obtained due to an improper or no matrix-stabilizing treatment, the resulting titanium carbide body has poor ductility, poor strength and inferior performance as a hot shaping or working die.

As has been mentioned hereinbefore, the titanium carbide bodies provided by the invention have improved resistance to oxidation compared to bodies made of cemented titanium carbide and of cemented tungsten carbide. This is illustrated by Figs. 11, 12, and 13 which show specimens of an infiltrated titanium carbide provided by the invention, a cemented titanium carbide body containing 20% by weight of nickel, and a cemented tungsten carbide body containing 13% by weight of cobalt, respectively, after being subjected to oxidation at an elevated temperature. The first two specimens were subjected to oxidation in air at a temperature of 1000° C. for 100 hours while the latter was only exposed for one hour due to its rapid deterioration. Upon completion of the test, the specimens were cooled to room temperature. It will be noted by comparing Fig. 11 to Fig. 12 that the infiltrated titanium carbide produced in accordance with the invention (Fig. 11) is markedly superior to cemented titanium carbide (Fig. 12) in resistance to high temperature oxidation. On the other hand, the cemented tungsten carbide (Fig. 13) has extremely poor resistance to high temperature oxidation which makes it unsuitable for hot shaping dies.

In addition to having excellent resistance to oxidation, the titanium carbide bodies provided by the invention also exhibit remarkable resistance to thermal shock. A test which is employed in evaluating the resistance of metals to thermal shock is as follows:

A rectangular test specimen measuring one-quarter (¼) inch thick by three-eighths (⅜) inch wide by two (2) inches long is heated in a gas flame to a temperature of about 1100° C. and then quenched in water. The number of repeated heating and quenching cycles that the specimen can withstand without cracking is taken as a measure of resistance to thermal shock. An infiltrated titanium carbide body of the invention when subjected to the foregoing test showed excellent resistance to thermal shock in that it withstood as many as 21 heating and quenching cycles. However, when a cemented titanium carbide body containing 30% by weight of nickel was subjected to the same test, the body withstood only 10 heating and quenching cycles. A tungsten carbide body cemented with 13% by weight of cobalt cracked, shattered, and spalled during the first quenching cycle.

The improved combination of properties which can be obtained by the present invention are shown by referring to Table I below, which gives various physical and mechanical properties of a typical infiltrated titanium carbide body. This body was produced by infiltrating a porous titanium carbide skeleton comprising about 60% by volume of the body with a matrix-forming heat and oxidation resistant high temperature alloy known by the trade name of Hastelloy C.

TABLE I

| | |
|---|---|
| Specific gravity | 6.0–6.3. |
| Transverse rupture strength at room temperature. | 150,000–175,000 p. s. i. |
| Transverse rupture strength at 850° C. | 150,000–175,000 p. s. i. |
| Transverse rupture strength at 1000° C. | 100,000–120,000 p. s. i. |
| Tensile strength at room temperature. | 60,000–80,000 p. s. i. |
| Tensile strength at 1000° C. | 45,000–50,000 p. s. i. |
| Stress rupture strength at 1000° C. for 100 hrs. | 12,000–14,000 p. s. i. |
| Elongation at 1000° C. for 100 hrs. under load of 12,000 p. s. i. | 5–15%. |
| Modulus of elasticity at room temperature. | 25–30,000,000 p. s. i. |
| Modulus of elasticity at 1000° C. | 20–25,000,000 p. s. i. |
| Hardness, Rockwell "C" scale at room temperature. | 56–60. |
| Hardness, Rockwell "C" scale at 650° C. | 46–50. |
| Thermal expansion per ° F. over range from 70° to 1200° F. | $4.44 \times 10^{-6}$. |
| Thermal conductivity | 0.060 cal./sec./° C./cm. |
| Electrical conductivity | 1% of I. A. C. S. |
| Electrical resistivity | $0.43–0.47 \times 10^{-3}$ $\Omega$/cm.³. |
| Weight gain 100 hr. exposure to still air at 1800° F. | 0.3–0.5 mg./cm.². |

It will be noted from Table I that the modulus of elasticity is of the order of 25,000,0000 to 30,000,000 p. s. i. at room temperature (which is close to that for steel) while it is only slightly reduced to about 20,000,000 to 25,000,000 p. s. i. at 1000° C. Further, it will also be noted that the hardness of such die material is of the order of 56 to 60 Rockwell C (about 79 to 81.2 Rockwell A) and that this value is only reduced to a hardness of 46 to 50 Rockwell C (about 73.6 to 75.9 Rockwell A) at 650° C., which is relatively high for a die material at that temperature. Likewise at a temperature of 1000° C. the modulus of rupture is reduced only to a value of 100,000 p. s. i. from a room temperature value of 150,000 p. s. i., whereas there is little or no change between the value at room temperature and the value at 850° C. Similarly, the tensile strength at 1000° C. is only reduced to 45,000 p. s. i., from a room temperature value of 60,000 p. s. i. A tungsten-bearing steel, on the other hand, drops off in tensile strength to an appreciably greater extent when heated to 1000° C. Most important of all, the titanium carbide-bearing die material exhibits a marked elongation in long-time stress application at elevated temperatures, amounting to as much as 5 to 15% at 1000° C. Cemented titanium or tungsten carbide materials, on the other hand, exhibit no such elongation at any temperature.

As has been mentioned hereinbefore, in producing infiltrated titanium carbide dies in accordance with the invention, it is essential that a matrix-forming, heat resistant alloy be employed as the infiltrant metal. Alloys which have been found to give good results as infiltrant metals include nickel-base, cobalt-base, and iron-base heat resistant alloys. In general these infiltrant alloys may be employed to produce infiltrated titanium carbide dies containing 40% to 80% by volume of titanium carbide, the balance comprising about 60% to 20% by volume of the infiltrant alloy.

When employing a nickel-base infiltrant alloy, e. g., Inconel, for producing die bodies, a satisfactory range comprises about 40% to 75% by volume of titanium carbide, the balance comprising about 60% to 25% by volume of the nickel-base alloy. Compositions which have been found to give good commercial results comprise using the preferred composition range of 45% to 70% by volume of titanium carbide and about 55% to 30% by volume of the nickel-base alloy. The improved results which can be obtained by employing a nickel-base alloy as the infiltrant metal, e. g., Inconel, is shown by referring to Fig. 16 which depicts a set of curves illustrating the improved physical and mechanical properties exhibited by various compositions of Inconel-infiltrated titanium carbide composites.

Likewise, when employing a cobalt-base alloy as the infiltrant metal, e. g., Stellite 31, good results are obtained with a composition range containing about 50% to 80% by volume of titanium carbide, the balance comprising about 50% to 20% by volume of the cobalt-base alloy. For best results, a preferred composition range may be employed comprising about 55% to 75% by volume of titanium carbide and about 45% to 25% by volume of the cobalt-base alloy. As illustrative of the excellent properties which are obtained by employing a cobalt-base alloy as the infiltrant metal, e. g., Stellite 31, attention is directed to Fig. 17 which depicts a set of curves showing the improved physical and mechanical properties exhibited by various compositions of Stellite 31-infiltrated titanium carbide composites.

Iron-base, heat resistant alloys have also been employed as infiltrant metal in producing titanium carbide dies within the scope of the invention. One iron-base alloy which has been found to give the results of the invention when employed as an infiltrant metal is a high-chromium stainless steel referred to as No. 446 alloy containing about 25% chromium, substantially the balance being iron containing the usual residual elements, such as carbon, silicon, manganese, etc. In employing an iron-base alloy as an infiltrant metal, e. g., a high-chromium stainless steel such as the 446 alloy, a satisfactory composition range comprises about 40% to 70% by volume of titanium carbide, the balance containing about 60% to 30% by volume of the high-chromium stainless steel. For more consistent results, a preferred composition range may be employed comprising about 50% to 65% by volume of titanium carbide and about 50% to 35% by volume of the high chromium steel infiltrant metal. The following table illustrates the results which can be obtained with the 446 high-chromium stainless steel alloy.

| Percent by Volume Titanium Carbide | Properties at 1,000° C. | |
|---|---|---|
| | Modulus of Rupture, p. s. i. | Bending Angle, Degrees |
| 46.8 | 89,500 | 15 |
| 61.0 | 105,000 | 24 |
| 66.3 | 123,000 | 38 |
| 67.0 | 102,000 | 20 |
| 68.5 | 75,000 | 13 |
| 70.9 | 54,000 | 10 |

Because of the aforementioned optimum combination of properties, a die made of the titanium carbide material provided by the invention is capable of withstanding mechanical shock due to high and sudden stresses at high hot working temperatures in that it is able to adjust itself elastically to give optimum stress distribution, despite its high hot hardness and high hot strength. Even local stress concentrations will not result in failure of the die material in view of its noticeable ductility which allows for an elastic readjustment of the die under a great load. Also the dies provided by the invention can be advantageously preheated in accordance with conventional extrusion practice without being adversely affected.

For the purpose of giving those skilled in the art a better understanding of the invention, the following illustrative examples are given:

*Example 1*

A titanium carbide powder of about 325 mesh size containing approximately 75% titanium, 18% combined carbon, and 2.5% free carbon was charged into a graphite crucible and heat-treated in a reducing atmosphere at a temperature of about 1900° C. for a period of about 1 hour. An agglomeration of the powder occurred which, after cooling, was crushed, pulverized, and passed through a 140 mesh sieve. The resulting heat-treated titanium carbide powder was then mixed with 10% by weight of carbonyl nickel powder of about 325 mesh size and the whole dry milled in a stainless steel ball mill for 24 hours.

Figure 1:
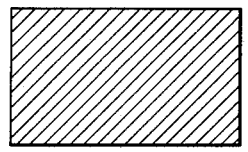
Figures 1 to 7 show a group of sketches illustrating two methods for producing dies within the scope of the invention.
Figure 2:
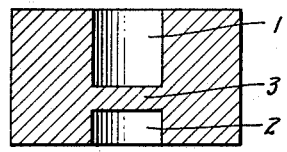

The ball-milled titanium carbide-nickel powder mixture was blended dry with 1% by weight of Resinox plastic, was then moistened with acetone and wet mixed thoroughly, and the powder mass finally dried, pulverized, and passed through a 100 mesh screen. About 130 grams of the powder mixture was compacted cold in a carbide lined steel die at a pressure of 10 tons per square inch (t. s. i.) into a slug, about 1.6 inches diameter by 1.0 inch high, of approximately 60% of full density (Fig. 1).

The pressed compact was pre-sintered at 1200° C. for about ½ to 1 hour under a hydrogen atmosphere. The pre-sintered compact was partially machined or drilled from top and bottom, leaving approximately 0.2 inch of material (permeable barrier 3 in Fig. 2) in the cavity. The partially machined blank was then subjected to a high temperature sinter in a carbon tube furnace at about 1600° C. to 1700° C. for approximately 3 hours under vacuum which during the sintering period improved from a pressure of about 500 microns of mercury to a pressure of 50 microns of mercury comprising a furnace atmosphere of substantially carbon monoxide.

After cooling under vacuum, the sintered skeleton blank was machined to a shape approximating the dimensions of the final die (Fig. 3). A retaining wall, ridge, or lip 4 was left on the outer edge of the entrance port or face of the die, and a lead hole or depression 5 was machined in the 0.2 inch thick permeable barrier 3 of the cavity. The final weight of the skeleton after machining was 60 grams and its density was 66% of full density.

About 20 grams of Inconel in the form of a disc was placed in the bottom of a ceramic dish, the machined die skeleton placed bell-up on top of the Inconel disc, and about 40 grams of Inconel in the form of a cast button was placed in the cavity formed by the entrance or inlet port of the die. The whole assembly was heated in a carbon tube vacuum furnace to 1500° C., for approximately 2 hours, during which heating the Inconel melted and infiltrated the die skeleton from both the top and bottom and dissolved the necessary amount of titanium carbide to attain equilibrium. The carbon monoxide furnace atmosphere resulting from the reaction of residual atmospheric oxygen with the carbon tube of the furnace was evacuated during the heating, the infiltration, and the matrix-stabilizing treatments. The vacuum improved during the period from a pressure of about 400 microns to a pressure of about 100 microns of mercury. The total time required to complete the infiltration and the matrix-stabilizing treatments amounted to about 130 minutes, of which about 25 minutes was used to complete the infiltration. The infiltrated and matrix-stabilized die was cooled under vacuum until the infiltrant-base matrix had solidified. Cooling was continued to room temperature under a neutral or reducing atmosphere at atmospheric pressure.

The resulting die which contained about 63% by volume of titanium carbide had a weight of 119 grams and a density of 6.12 grams per cubic centimeter. It was machined and lapped to the final die dimensions (Fig. 4) prior to insertion and shrink-fitting into an alloy steel casing.

*Example 2*

The procedure as described in Example 1 was employed with the exception that the pre-sintered skeleton blank (Fig. 5) of method B was machined to approximately final die dimensions prior to the high temperature vacuum sintering at 1600° C. to 1700° C. (Fig. 6). The die cavity was not cut all the way through in the operation, leaving approximately 0.2 inch of permeable barrier 3 separating blind holes 1 and 2 (Fig. 6). After machining, the die skeleton was sintered, infiltrated with Inconel and matrix-stabilized in a carbon tube vacuum furnace as described in Example 1, and then finished and shrink-fitted in an alloy steel casing. The infiltrated and matrix-stabilized die had a weight of 119 grams and a density of 6.12 grams per cubic centimeter (g./cc.).

*Example 3*

The procedure described in Example 1 was employed with the exception that 5% by weight of carbonyl nickel was mixed with the titanium carbide and ball-milled for 24 hours. About 80 grams of the powder mixture was compacted cold in a carbide lined steel die at a pressure of 10 t. s. i. into a slug 1.425 inches in diameter by 0.875 inch high.

The pressed compact was pre-sintered at 1200° C. for ½ hour under a hydrogen atmosphere. The pre-sintered skeleton was machined to approximately final dimensions of the die, except that the die cavity was not cut through the blank, but approximately 0.2 inch of the permeable barrier was left near the bottom of the compact. The machined skeleton weighing 55 grams was then given a high temperature sinter and infiltrated with Inconel and then matrix-stabilized in a carbon tube vacuum furnace in accordance with Example 1. The total time required to complete the infiltration and the matrix-stabilizing treatments was about 110 minutes, of which about 20 minutes was required to complete infiltration. The weight of Inconel employed was 30 grams in the form of a cast button on top and 20 grams in the form of a disc at the bottom.

The infiltrated and matrix-stabilized die had a weight of 95 grams and a density of 6.12 g./cc. The titanium content was about 65% by volume. The die was finished and cased in alloy steel in accordance with the procedure given in Example 1.

*Example 4*

The procedure described in Example 1 was employed with the exception that a larger body was hot pressed from a titanium carbide-metal powder mixture containing 10% cobalt powder of minus 325 mesh size. An approximately 60% dense, ring-shaped hollow cylinder skeleton body was produced by pouring 194 grams of the carbide-metal powder mixture into an annular cavity of 2.5 inch outside diameter of a graphite mold having a thickness of 3 inches and an outside diameter of 6 inches, and a 1 inch diameter core. The tubular graphite punches acting in opposite directions were used to form a cavity having a depth of $1^{3}/_{16}$ inch when pressed flat with the facings of the mold. After filling the cavity with the powder, the punches projected approximately one-quarter inch on each facing of the mold.

The filled mold was inserted into a carbon-lined vertical induction furnace kept at 1100° C. The furnace was closed and the mold was then heated to 1600° C. in the absence of oxygen and nitrogen in its cavity for over a period of 90 minutes, the induction current being shut off for five minutes each at 1300° C. and 1500° C. to permit thorough penetration of the heat throughout the mold and powder mass. The mold was kept at 1600° C. for 75 minutes and a pressure of 2000 p. s. i. exerted, until the punches were pressed flush with the mold body. Carefully controlled cooling followed, the temperature being reduced 100° C. every five minutes until 1200 C. was reached. At 1200° C. the mold was removed from the furnace and cooled.

The skeleton body was then removed, reheated in a carbon tube vacuum furnace and first sintered to a density of about 62% of full in accordance with Example 1, and then, in a second operation, infiltrated with Vitallium (Stellite 21) followed by the matrix-stabilization treatment, as described in Example 1. The weight of the Vitallium charge was 201 grams. The total time required to complete the infiltration and the matrix stabilizing treatments at 1525° C. was about 195 minutes, of which about 45 minutes was required to complete the infiltration.

The final weight of the infiltrated body was 395 grams, and the final density of the body was 6.44 grams per cubic centimeter. The titanium carbide content was about 59% by volume.

The die was finish-machined and ground on all outside faces and the center bore hole, and finally cased in a steel block.

*Example 5*

The procedure employed was similar to Example 4 with the exception that approximately 230 grams of a powder mixture containing titanium carbide and 10% by weight of carbonyl nickel powder of about 325 mesh size was charged into a graphite mold and hot-pressed in the mold at a pressure of 1500 p. s. i. and at a temperature of 1650° C. for 90 minutes to form a skeleton body measuring 2.5 inches in diameter and 0.8 inch high and having a density of about 63% of full density.

The hot-pressed skeleton was machined to approximately final die dimensions except that the die cavity was not cut all the way through. The machined skeleton body was given a high temperature sinter in a carbon tube vacuum furnace as in Example 1. The weight of the sintered skeleton was about 210 grams and its density was about 66% of full density.

About 230 grams of Hastelloy "C" was then placed in the cavity and on the upper surface of the sintered skeleton which had been placed in a ceramic dish. The whole assembly was heated in a carbon tube vacuum furnace to 1450° C. for approximately 2 hours, during which heating the Hastelloy "C" alloy melted and infiltrated the die skeleton from the top downward and dissolved the necessary amount of titanium carbide to attain equilibrium and to stabilize the matrix. The total time required to complete the infiltration and the matrix-stabilizing treatments was about 150 minutes, of which about 30 minutes was required to complete the infiltration. The furnace atmosphere and conditions were the same as described in Example 1. After cooling, in accordance with the procedure of Example 1, the resulting infiltrated die had a weight of 440 grams and a density of 6.65 grams per cubic centimeter. The titanium content was about 62% by volume.

The die was finish-machined, ground, and lapped to the final die dimensions prior to insertion and shrink-fitting into an alloy steel casing.

As has been mentioned hereinbefore, the titanium carbide die made in accordance with the invention may be employed for the hot extrusion of metals over a wide range of working temperatures. Some of the extrusion temperatures to which the die is subjected at the moment of impact with the billet to be extruded is illustrated by the following:

| Metal | Surface Temperature Range of Billet in Extrusion |
| --- | --- |
| Brass | 750° C. to 850° C. |
| Duron bronze | 850° C. to 950° C. |
| Monel | 950° C. to 1,150° C. |
| Carbon steel | 1,000° C. to 1,150° C. |
| Stainless steel | 1,100° C. to 1,200° C. |
| Nickel | 1,100° C. to 1,200° C. |
| Inconel | 1,100° C. to 1,200° C. |

Test results with titanium carbide dies infiltrated with a nickel alloy, e. g., Hastelloy C, Inconel, etc., in accordance with the invention have shown excellent performance in the extrusion of materials of the aforementioned types. For example, in the hot extrusion of a 65–35 brass alloy through a ¾ inch die made in accordance with the invention, over 250 extrusions were obtained as compared to a maximum of 50 extrusions obtainable with tungsten steel dies conventionally used for this work. In the extrusion of carbon steel billets into one inch rods, five long extrusions were completed without any ill effects to the titanium carbide die provided by the invention. A close examination of the die did not reveal any cracks, seizures, galling, build-ups, wash-outs, etc., and in fact, the die was capable of many more extrusion cycles. Moreover, the surface quality of the resulting extruded rods was excellent. In addition, only one-half of the extrusion pressure employed in the case of alloy steel dies was required due to the low-coefficient of friction of the titanium carbide die. A tungsten steel die, on the other hand, resulted in severe wash-outs and deformation even before the first extrusion was completed.

While infiltration is the most desired method for producing the dies provided by the invention, the dies may also be prepared by pressing a powdered mixture of the different ingredients in the proper proportions at room temperature into a die shape, followed by sintering at a temperature above the melting point of the matrix-forming heat resistant alloy phase but below the melting point of the carbide, the sintering being carried out in the presence of a substantially stationary liquid phase of the heat resistant alloy. While the liquid phase in the above method is considered to be essentially stationary as compared to the infiltration method which works on the principle of a mass capillary action, nevertheless the liquid phase may move slightly during part of the sintering cycle due to a microscopic capillary action induced by the minute pores in the compressed powder die body and also due to plastic flow caused by shrinkage forces. In employing the foregoing method, the usual precautions must be taken in pressing oversize bodies so as to allow for shrinkage in subsequent heating operations. Likewise, great care in the selection of the powdered ingredients and in the sintering cycle and atmosphere, as well as the supports and forms used for the dies during sintering must be exercised.

As has been mentioned hereinbefore, the present invention is applicable not only to hot metal extrusion dies but also to the production of other types of hot shaping dies including dies which are used to hot deform metals and alloys into complicated shapes. The present invention includes within its scope dies for die forging, die casting, hot swaging and upsetting, and also hot pressing dies for use in powder metallurgy at elevated temperatures.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. In a method for producing a shaping die composed of a composite body containing titanium-base carbide, substantially the balance being a matrix-forming infiltrant metal; the steps comprising mixing powdered titanium-base carbide particles with up to about 10% by weight of an auxiliary binder metal selected from the group consisting of nickel, cobalt and iron; forming a porous, coherent, skeleton body therefrom comprising about 40% to 80% by volume of said titanium-base carbide having intercommunicating pores therethrough; rough machining said skeleton body into substantially the shape of a die with passageways corresponding to inlet and outlet ports separated by a thin porous barrier defining a reservoir; placing in said reservoir said matrix-forming infiltrant metal selected from the group consisting of iron, cobalt and nickel, mixtures of these metals with each other, and with at least one of the metals chromium, molybdenum, tungsten, vanadium, columbium and tantalum; subjecting said rough machined skeleton die body and said infiltrant metal contained therein to an infiltration treatment comprising heating the whole to a temperature ranging from about 25° C. to 250° C. above the liquidus temperature of the infiltrant metal at a subatmospheric pressure below about 1000 microns of mercury for a time sufficient to enable the porous skeleton die body to be completely infiltrated; then further subjecting said infiltrated die body to a matrix stabilizing treatment in situ within said infiltration temperature range for a time sufficient to modify the microstructure of said skeleton die body, the total time for both the infiltration and stabilizing treatments ranging from about ½ to 2½ hours per cubic inch of skeleton body; cooling said treated body to room temperature whereby a composite die body is produced having a microstructure comprising a continuous matrix of substantially said matrix-forming infiltrant metal having dispersed therethrough fine particles of a precipitate and essentially isolated larger titanium-base carbide particles and particle aggregates having substantially spheroidal polygonal shapes; and then finish-machining said die body to desired dimensions.

2. The method of claim 1, wherein the titanium-base carbide ranges from about 45% to 75% by volume, and wherein the matrix-forming metal ranges from about 55% to 25% by volume.

3. The method of claim 1, wherein the titanium-base carbide ranges from about 40% to 75% by volume, and wherein the matrix-forming metal is a heat-resistant, nickel-base alloy ranging from about 60% to 25% by volume.

4. The method of claim 3, wherein the titanium base carbide ranges from about 45% to 70% by volume, and wherein the matrix-forming nickel-base alloy ranges from about 55% to 30% by volume.

5. The method of claim 1, wherein the titanium-base carbide ranges from about 50% to 80% by volume, and wherein the matrix-forming metal is a heat-resistant, cobalt-base alloy ranging from about 50% to 20% by volume.

6. The method of claim 5, wherein the titanium-base carbide ranges from about 55% to 75% by volume, and wherein the matrix-forming cobalt-base alloy ranges from about 45% to 25% by volume.

7. The method of claim 1, wherein the titanium-base carbide ranges from about 40% to 70% by volume, and wherein the matrix-forming metal is a heat-resistant, iron-base alloy ranging from about 60% to 30% by volume.

8. The method of claim 7, wherein the titanium-base carbide ranges from about 50% to 65% by volume, and wherein the matrix-forming iron-base alloy ranges from about 50% to 35% by volume.

References Cited in the file of this patent

UNITED STATES PATENTS

| | | |
|---|---|---|
| 1,512,191 | Baumhauer | Oct. 21, 1924 |
| 1,910,532 | Fetkenheuer | May 23, 1933 |
| 1,992,372 | Holzberger | Feb. 26, 1935 |
| 2,121,448 | Ritzau | June 21, 1938 |
| 2,244,053 | Comstock | June 3, 1941 |
| 2,313,070 | Hensel | Mar. 9, 1943 |
| 2,422,439 | Schwarzkopf | June 17, 1947 |
| 2,456,779 | Goetzel | Dec. 21, 1948 |
| 2,581,252 | Goetzel et al. | Jan. 1, 1952 |
| 2,612,443 | Goetzel et al. | Sept. 30, 1952 |

OTHER REFERENCES

Goetzel: Treatise on Powder Metallurgy, pub. by Interscience Publishers, Inc., New York, vol. 2 (1950) pp. 160–164.

Trent et al.: Metallurgia (Aug. 1950) pp. 111–115.